United States Patent
Goodfellow

(10) Patent No.: US 11,024,434 B2
(45) Date of Patent: Jun. 1, 2021

(54) NUCLEAR POWER GENERATION SYSTEM

(71) Applicant: ROLLS-ROYCE POWER ENGINEERING PLC, Derby (GB)

(72) Inventor: Martin J Goodfellow, Nottingham (GB)

(73) Assignee: ROLLS-ROYCE POWER ENGINEERING PLC, Derby (GB)

( * ) Notice: Subject to any disclaimer, the term of this patent is extended or adjusted under 35 U.S.C. 154(b) by 536 days.

(21) Appl. No.: 16/180,167

(22) Filed: Nov. 5, 2018

(65) Prior Publication Data

US 2019/0164657 A1 May 30, 2019

(30) Foreign Application Priority Data

Nov. 28, 2017 (GB) .................................. 1719715

(51) Int. Cl.
| | |
|---|---|
| *G21C 19/18* | (2006.01) |
| *B66C 17/06* | (2006.01) |
| *G21C 19/20* | (2006.01) |
| *G21C 19/32* | (2006.01) |
| *B66C 19/00* | (2006.01) |

(52) U.S. Cl.
CPC .............. *G21C 19/18* (2013.01); *B66C 17/06* (2013.01); *B66C 19/007* (2013.01); *G21C 19/20* (2013.01); *G21C 19/207* (2013.01); *G21C 19/32* (2013.01); *Y02E 30/30* (2013.01)

(58) Field of Classification Search
CPC ........ G21C 19/00; G21C 19/02; G21C 19/18; G21C 19/19; G21C 19/20; G21C 19/26; G21C 19/32; B66C 17/00; B66C 17/06
USPC ..................................... 104/96; 212/312, 71
See application file for complete search history.

(56) References Cited

U.S. PATENT DOCUMENTS

| | | | | |
|---|---|---|---|---|
| 4,036,687 A | * | 7/1977 | Rickard | G21C 19/32 376/293 |
| 4,181,231 A | * | 1/1980 | Morrissey, Jr. | B66C 11/16 104/137 |
| 4,203,368 A | | 5/1980 | Haskins | |
| 5,061,432 A | * | 10/1991 | Matusz | G21C 19/207 376/260 |

FOREIGN PATENT DOCUMENTS

| | | | | |
|---|---|---|---|---|
| GB | 852027 A | * | 10/1960 | ............. G21C 19/18 |
| GB | 1206621 A | * | 9/1970 | ............. G21C 19/20 |
| GB | 1206621 A | | 9/1970 | |
| GB | 1472477 A | | 5/1977 | |
| WO | WO-2014197068 A2 | * | 12/2014 | ............. G21C 19/00 |

OTHER PUBLICATIONS

Mar. 13, 2019 extended European Search Report issued in Great Britain Patent Application No. 18204085.7.
May 14, 2018 Search Report issued in Great Britain Patent Application No. 1719715.3.

* cited by examiner

*Primary Examiner* — Jack W Keith
*Assistant Examiner* — Jinney Kil
(74) *Attorney, Agent, or Firm* — Oliff PLC

(57) ABSTRACT

The nuclear power generation system of the present invention comprises a reactor vessel. It further comprises a first crane gantry defining a fuel rod path along which nuclear fuel rods can be moved to/from the reactor vessel and a second crane gantry defining a component path along which reactor vessel components can be moved to/from the reactor vessel. The the first and second crane gantries both have a fixed radial orientation relative to the reactor vessel.

13 Claims, 5 Drawing Sheets

NUCLEAR POWER GENERATION SYSTEM

This disclosure claims the benefit of UK Patent Application No. GB 1719715.3, filed on 28 Nov. 2017, which is hereby incorporated herein in its entirety.

FIELD OF INVENTION

The present invention relates to a nuclear power generation system including crane gantries for maintenance and refuelling; and to a method of performing maintenance and refuelling operations in a nuclear power generation system.

BACKGROUND

Maintenance and refuelling is an important part of the operation of a nuclear power generation system. Maintenance is required periodically, e.g. to replace old and/or damaged parts of the system. Refuelling is required periodically, in order to replace spent fuel rods.

When performing maintenance/refuelling of a reactor vessel, it is necessary to remove at least the reactor vessel head from the reactor vessel, thereby revealing an interior of the reactor vessel. When performing refuelling, it is also necessary to remove some of the internal components of the reactor vessel, in order to access the fuel rods (which are usually located towards the base of the reactor vessel).

In order to safely perform maintenance and refuelling operations in a nuclear power generation system, a polar crane arrangement having a circular runway is typically provided within the containment structure of the system. Polar cranes are necessarily large, heavy structures in order to allow the lifting of the heavy components of the nuclear power generation system. This makes polar cranes expensive to install.

FIG. 1 shows the layout of a pressurised water reactor (PWR) system comprising a reactor core 1 within a pressurised reactor vessel 2, and steam generators 3 thermally coupled to the reactor vessel 2 by coolant loops 3'. The system also comprises a pressuriser and turbine generator (not shown). These components are all housed within a containment structure 7 which is designed to contain any leaks of radioactive steam or gas.

Thermal energy from nuclear fuel rods in the reactor core 1 heats pressurised water (which is pressurised by a pressuriser, not shown) in the reactor vessel 2, which is pumped under pressure to the steam generators 3 via the coolant loops 3', where it is used to generate steam which then drives the turbine generator to produce electrical energy.

The steam generators 3 are vertically elongated, e.g. have a significant vertical height, in order to accommodate heat exchangers having a large surface area.

The polar crane arrangement comprises a polar gantry 5 carrying a hoist 6. The polar gantry 5 is configured to rotate through a full 360° on a circular support structure 5', in order to change the radial orientation of the crane arrangement relative to the reactor vessel 2 for performing maintenance and refuelling. In particular, the gantry is rotated to a first angle for removing a reactor vessel head from the reactor vessel (e.g. to enable access to the interior of the reactor vessel); to a second angle for moving internal components to/from the reactor vessel; and to a third angle for moving nuclear fuel rods to/from the reactor vessel. Thus, maintenance and refuelling operations are all performed by the same polar crane arrangement.

The hoist of the polar crane arrangement (which carries tool attachments for maintenance/refuelling) hangs down below the polar gantry. Any components of the nuclear power generation system (e.g. steam generators, pressuriser, etc.) mounted in a 'damage risk area' around the reactor vessel are therefore at risk of damage from impact with the crane tool attachments. This is a particular concern for steam generators, which, as discussed above, have a significant vertical height such that they extend above the reactor vessel.

As a result, in the known systems:
i. the polar crane arrangement is positioned high above the reactor vessel and steam generators to mitigate the risk of contact between the hoist tool attachments and the system components—this increases the height and volume (and thus construction cost) of the containment structure 7—furthermore, the elevated position of the polar crane (which is 100s of tonnes in weight) presents a substantial engineering challenge particularly in terms of seismic resilience; and
ii. steam generators and the pressuriser are radially spaced from the reactor vessel, so that they are not within the damage risk area. This increases the length of ducts carrying pressurised water between the reactor vessel and the steam generators/pressuriser, and also increases the total diameter of the nuclear reactor, which further increases the cost of construction of the containment structure 7.

As mentioned above, various tool attachments must be used with the polar crane arrangement for the refuelling and maintenance operations. Moreover, specialized attachments tend to be used for each operation. An internal component tool is attached to the hoist for moving internal components to/from the reactor vessel, and a separate nuclear fuel rod tool is attached to the hoist for moving nuclear fuel rods to/from the reactor vessel. The need to change between these various tool attachments increases the down-time of the system when performing maintenance and refuelling.

There is a need for an improved nuclear power generation system which mitigates at least some of the problems associated with the use of a polar gantry came.

STATEMENT OF INVENTION

In a first aspect, there is provided a nuclear power generation system comprising:
a reactor vessel;
a first crane gantry defining a fuel rod path along which nuclear fuel rods can be moved to/from the reactor vessel; and
a second crane gantry defining a component path along which reactor vessel components can be moved to/from the reactor vessel;
wherein the first and second crane gantries both have a fixed radial orientation relative to the reactor vessel.

By providing first and second crane gantries which have a fixed radial orientation relative to the reactor vessel and which thus define fixed fuel rod and component paths respectively, the rotating polar crane arrangement of the prior art is dispensed with along with its associated problems. For example, the radially fixed gantries will be easier and therefore less costly to install. Furthermore, because the crane gantries do not rotate, they do not trace out a circular/angular path around the reactor vessel, and so the circumferential damage risk area around the reactor vessel is effectively eliminated. Components of the nuclear power generation system (e.g. steam generator, pressuriser, etc.) can therefore be mounted close to the reactor vessel thus reducing the footprint of the system (and the length of the ducting connecting the components). Furthermore, the crane gantries can be mounted at a lower height than in the prior art (as they don't need to rotate above the system components) thus further reducing the size of the containment structure and reducing weight at elevated height.

Furthermore, because each gantry may have its own dedicated hoist, it is not necessary to change between different attachment tools so that maintenance and refuelling so that system down-times are reduced.

In some embodiments, the first crane gantry/fuel rod path extends radially from proximal the reactor vessel to a position radially spaced from the reactor vessel, e.g. to a position above a fuel rod pond.

In some embodiments, the system further comprises a plurality of steam generators circumferentially spaced about the reactor vessel and the first crane gantry/fuel rod path extends radially in a direction extending between a first and second of said plurality of steam generators. In these embodiments, the first crane gantry/fuel rod path may be vertically spaced above the steam generators or vertically spaced below the upper extremity of the steam generators i.e. the first crane gantry may have a vertical height between the vertical height of the steam generators and the reactor vessel.

The first gantry may be provided with a fuel rod hoist for hoisting the fuel rods. The fuel rod hoist is movable along the first gantry.

The first gantry may comprise a single rail (e.g. a monorail) for supporting the fuel rod hoist. In some embodiments, it comprises a pair of parallel rails for supporting the hoist. The rail(s) define the fuel rod path. The rail(s) may be linear.

In some embodiments, the second crane gantry/component path extends radially from proximal the reactor vessel e.g. proximal the centre of the system to a position radially spaced from the reactor vessel, e.g. to a reactor head storage position.

In embodiments where the system further comprises a plurality of steam generators circumferentially spaced about the reactor vessel, the second crane gantry/component path extends radially in a direction extending between two of said plurality of steam generators (other than between the first and second steam generators). For example, where there are three circumferentially spaced steam generators and the first gantry/fuel rod path extends in a segment between the first and second steam generator, the second gantry/component path may extend in a segment between the second and third or first and third steam generators. In these embodiments, the second crane gantry/component path may be vertically spaced above the steam generators or vertically spaced below the upper extremity of the steam generators, e.g. the second crane gantry may have a vertical height between the vertical height of the steam generators and the reactor vessel.

The second gantry may be provided with a component hoist for hoisting the reactor vessel components. The component hoist is movable along the second gantry.

The second gantry may comprise a single rail (e.g. a monorail) for supporting the component hoist. In some embodiments, it comprises a pair of parallel rails for supporting the hoist. The rail(s) define the component path. The rail(s) may be linear or may have a curved portion.

In some embodiments, the first gantry and second gantry are non-parallel and non-coaxial, e.g. the first and second gantry may extend in different, non-opposing radial directions from proximal the reactor vessel.

The first and second gantries (and thus the fuel rod path and component path) may be at an angle to one another e.g. at an oblique angle of between 110-140° such as at an angle of about 1200 relative to each other.

The system may further comprise a third crane gantry defining a further component path along which reactor vessel components can be moved to/from the reactor vessel wherein the third crane gantry has a fixed radial orientation relative to the reactor vessel.

In some embodiments, the third crane gantry/further component path extends radially from proximal the reactor vessel, e.g. proximal the centre of the system to a position radially spaced from the reactor vessel, e.g. to a reactor internals storage position.

In embodiments where the system further comprises a plurality of steam generators circumferentially spaced about the reactor vessel, the third crane gantry/further component path extends radially in a direction extending between two of said plurality of steam generators (other than between the first and second steam generators). For example, where there are three circumferentially spaced steam generators with the first gantry/fuel rod path extending in a segment between the first and second steam generators and the second gantry/component path extending in a segment between the second and third steam generators, the third crane gantry/further component path may extend between the first and third steam generators. Alternatively, where the second gantry/component path extends in a segment between the first and third steam generators, the third crane gantry/further component path may extend between the second and third steam generators.

In these embodiments, the third crane gantry/further component path may be vertically spaced above the steam generators or vertically spaced below the upper extremity of the steam generators, e.g. the third crane gantry may have a vertical height between the vertical height of the steam generators and the reactor vessel.

The third gantry may be provided with a further component hoist for hoisting the reactor vessel components. The further component hoist is movable along the third gantry.

The third gantry may comprise a single rail (e.g. a monorail) for supporting the further component hoist. In some embodiments, it comprises a pair of parallel rails for supporting the further component hoist. The rail(s) define the further component path. The rail(s) may be linear or may have a curved portion.

In some embodiments, the first gantry and third gantry are non-parallel and non-coaxial, e.g. the first and third gantry may extend in different, non-opposing radial directions from proximal the reactor vessel.

The first and third gantries (and thus the fuel rod path and further component path) may be at an angle to one another e.g. at an oblique angle of between 110-140° such as at an angle of about 120° relative to each other.

In some embodiments, the second gantry and third gantry are non-parallel and non-coaxial, e.g. the second and third gantry may extend in different, non-opposing radial directions from proximal the reactor vessel.

The second and third gantries (and thus the component path and further component path) may be at an angle to one another e.g. at an oblique angle of between 110-140° such as at an angle of about 120° relative to each other.

Where the system comprises a first gantry, second gantry, and third gantry, each gantry may form an angle of approximately 120° with adjacent gantries. In other words, the angular separations between the three gantries may be approximately uniform.

In other embodiments, the second and third gantries may be co-axial (e.g. extending in opposing radially directions at 180° to one another). In these embodiments, it may be necessary to space the steam generators unequally around the reactor vessel.

The second and third gantries (and thus the component path and further component path) may meet/be joined proximal the reactor vessel to form a combined component gantry defining a continuous combined component path (e.g. extending between a reactor head storage position and a reactor internals storage position via the reactor vessel). In these embodiments, the further component hoist may be omitted and the component hoist may be movable along both the second and third gantries (the combined component gantry).

In these embodiments, the combined component gantry/combined component path may be vertically spaced above the steam generators or vertically spaced below the upper extremity of the steam generators, e.g. the combined component gantry may have a vertical height between the vertical height of the steam generators and the reactor vessel.

The combined component gantry may comprise an angular deflection, e.g. an angular deflection of between 110-140° (e.g. around 120°) proximal the reactor vessel (e.g. where the system comprises three steam generators equally circumferentially spaced about the reactor vessel.)

The combined component gantry may comprise no angular deflection, e.g. the combined component gantry may be a linear gantry (e.g. where the system comprises three steam generators unequally circumferentially spaced about the reactor vessel.)

The combined component gantry may comprise a continuous curved transition (e.g. through between 110-140°, such as through about 120°) between the second and third gantries proximal the reactor vessel (e.g. where the system comprises three steam generators equally circumferentially spaced about the reactor vessel.)

In some embodiments, the reactor vessel is surrounded by a central support monolith e.g. circumferentially surrounding the reactor vessel. The central monolith may be used to support the radially innermost ends of the gantries. The increased proximity of the components of the nuclear power generation system (in particular the steam generators and pressurisers) to the reactor vessel means that they can also be mounted directly to the central monolith. Structural stability of the reactor is thereby improved. The central support monolith may further comprise one or more spokes which may extend radially from the portion circumferentially surrounding the reactor vessel.

There may be a first spoke portion extending underneath (e.g. vertically aligned with) the first crane gantry. Where the first crane gantry comprises a pair of rails, the first spoke portion may comprise a pair of first spokes, vertically aligned with the first crane gantry rails. The first spokes may be joined at their radially outermost end by a first connection portion.

There may be a second spoke portion extending underneath (e.g. vertically aligned with) the second crane gantry. Where the second crane gantry comprises a pair of rails, the second spoke portion may comprise a pair of second spokes, vertically aligned with the second crane gantry rails. The second spokes may be joined at their radially outermost end by a second connection portion.

There may be a third spoke portion extending underneath (e.g. vertically aligned with) the third crane gantry. Where the third crane gantry comprises a pair of rails, the third spoke portion may comprise a pair of third spokes, vertically aligned with the third crane gantry rails. The third spokes may be joined at their radially outermost end by a third connection portion.

The provision of a central support monolith with spoke portions allows mounting of both the reactor system components and the crane gantries which simplifies the construction of the reactor system compared to the prior art systems which requires separate mounting systems for the components and the polar crane.

In embodiments in which the reactor vessel is surrounded by a central support monolith, at least one of the plurality of steam generators may be mounted directly to the central support monolith. Preferably, the at least one steam generator is (are) mounted directly to the central support monolith at multiple attachment points.

In a second aspect, there is provided a method of operating a nuclear power generation system, the method comprising:
  providing a system according to the first aspect;
  moving nuclear fuel rods along the fuel rod path in a fixed radial orientation relative to the reactor vessel; and/or
  moving reactor vessel components along the component path in a fixed radial orientation relative to the reactor vessel.

BRIEF DESCRIPTION OF THE DRAWINGS

Embodiments will now be described by way of example only with reference to the accompanying drawings in which.

DETAILED DESCRIPTION AND FURTHER OPTIONAL FEATURES

Figure 1:
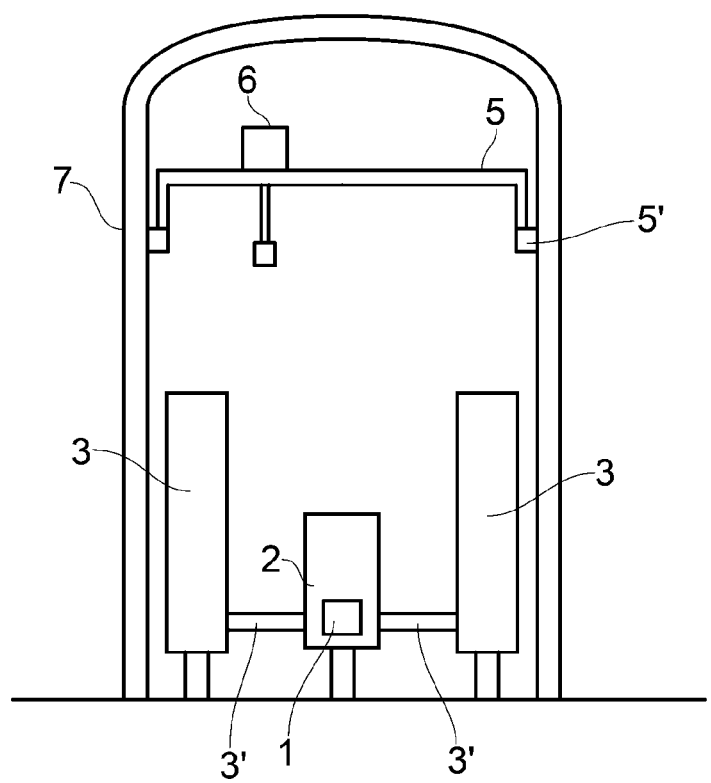
FIG. 1 shows a simplified schematic of a known nuclear power generation system.
Figure 2:
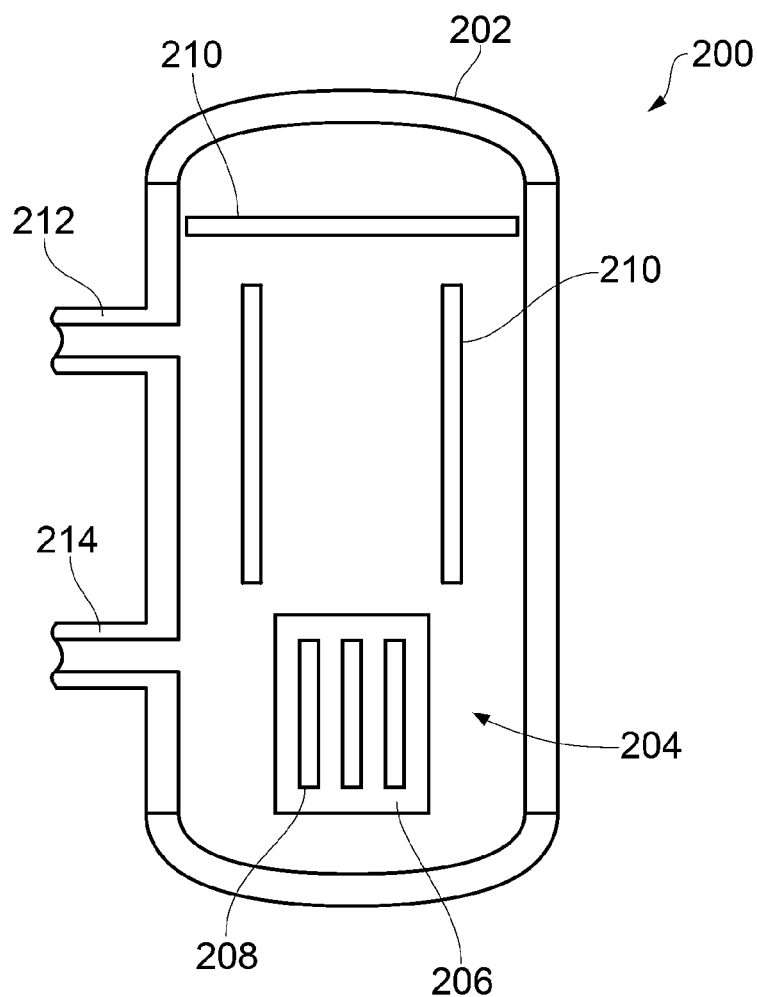
FIG. 2 shows a reactor vessel for use in an embodiment of the nuclear power generation system.

FIG. 2 shows a pressurised reactor vessel 200 for use in a nuclear power generation system of the pressurised water reactor (PWR) type. The reactor vessel 200 has a removable reactor head 202 for closing an upper opening in the reactor vessel 200 in use, thereby establishing a pressure boundary. The interior 204 of the reactor vessel 200 contains a reactor core 206 for holding nuclear fuel rods 208, and reactor vessel internal components 210. In use, the reactor vessel is filled with pressurised water.

A fluid outlet 212 is provided in a side-wall of the reactor vessel for transfer of hot pressurised water from the reactor vessel to a steam generator (not shown). A fluid inlet 214 is also provided in the side-wall of the reactor vessel for transfer of cool pressurised water back from the steam generator. As shown, the fluid outlet is positioned vertically above the fluid inlet. If more than one steam generator is used, then further inlets and outlets may be provided.

Periodically, it is necessary to service the internal components 210, and to replace the fuel rods 208 once they become 'spent', e.g. once they have been irradiated to the extent that they are no longer usable for energy production.

To service the internal components or replace spent fuel rods, the reactor head 202 first has to be removed, in order to reveal the interior of the reactor vessel. When the head has been removed, the internal components 210 and fuel rods 208 may be removed/replaced via the upper opening. For refuelling, some of the internal components 210 must also be removed, to enable access to the fuel rods 208 in the reactor core 206.

Figure 3:
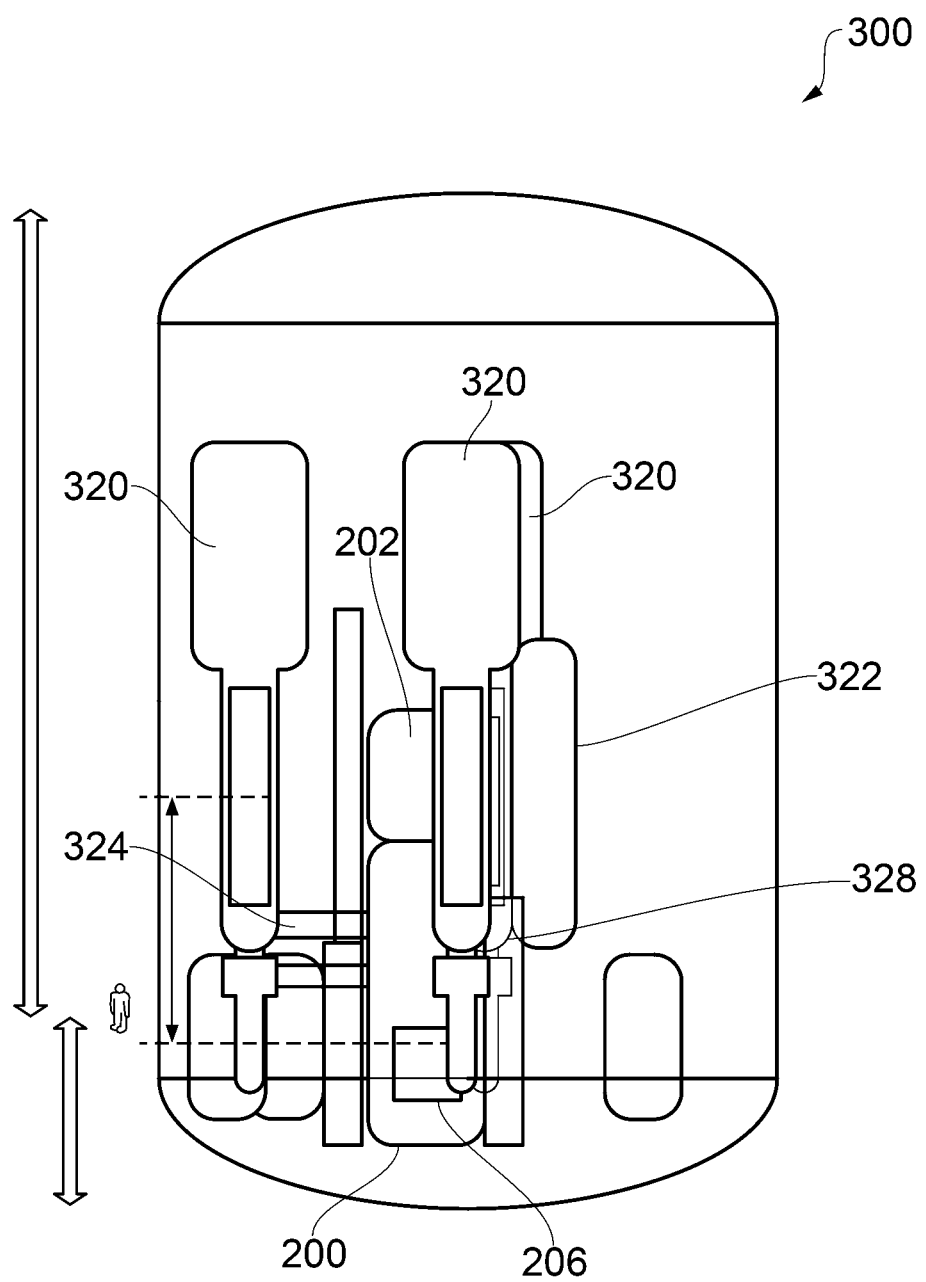
FIG. 3 shows a side-view of a nuclear power generation system according to the embodiment of the nuclear power generation system.
Figure 4:
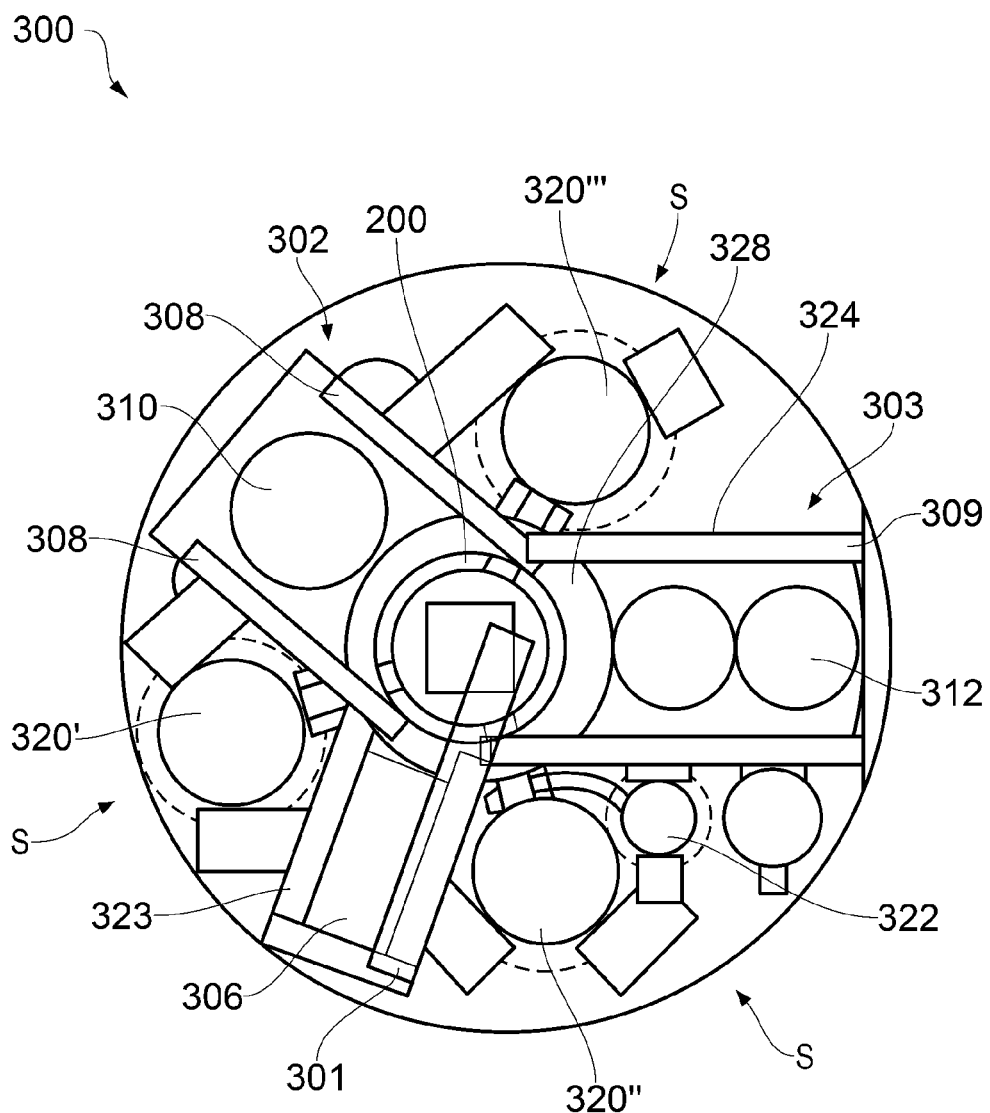
FIG. 4 shows a plan-view of the nuclear power generation system shown in FIG. 3.
Figure 5:
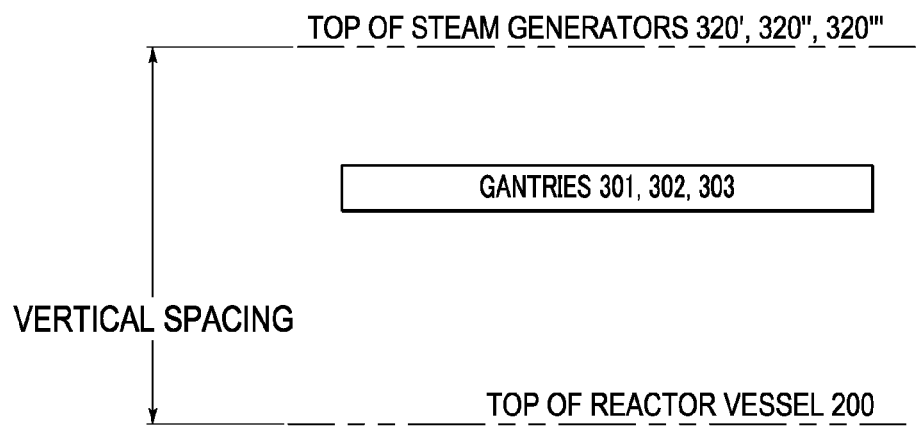
FIG. 5 shows a schematic representation of the relative positions of components.

FIGS. 3 and 4 show a PWR nuclear power generation system 300, which includes a first gantry 301 defining a fuel rod path extending from vertically above a fuel pond 306 to proximal the reactor vessel 200. The first gantry comprises a single, linear rail for supporting a fuel rod hoist (not shown) which is moveable along the first gantry 301. The first gantry 301 extends between a first steam generator 320' and a second steam generator 320".

The system 300 further comprises a second gantry 302 which includes two linear, parallel rails 308 defining a component path extending from proximal and vertically above a reactor head storage position 310 to proximal the reactor vessel 200. The second gantry 302 supports a component hoist (not shown) which is movable along the second gantry 302.

The second gantry 302 extends between the first steam generator 320' and a third steam generator 320'''.

The system 300 further comprises a third gantry 303 which includes two linear, parallel rails 309 defining a further component path extending from proximal and vertically above a reactor internals storage position 312 to proximal the reactor vessel 200. The third gantry 303 supports a further component hoist (not shown) which is movable along the third gantry 303. The third gantry 303 extends between the second steam generator 320" and the third steam generator 320'''.

As is clearly shown in FIG. 4, the first gantry 301, second gantry 302, and third gantry 303 each extend at different radial orientations relative to the reactor vessel 200. The angular separation between adjacent gantries is approximately 120°. The gantries 301, 302, 303 have a fixed radial orientation to the reactor vessel 200.

Because the gantries 301, 302, 303 do not move (are fixed in position), there are three 'safe' zones/segments S around the reactor vessel, through which the hoists do not move. Components of the nuclear power generation system can therefore be placed in these zones, without the risk of becoming damaged by impact with the hoists.

The three steam generators 320', 320", 320''' and a pressuriser 322 are placed in these 'safe' zones S. Moreover, they are placed very close to the reactor vessel 200 (because there is no risk of collision with a hoist in a space extending circumferentially around the reactor vessel 200), thus keeping the total foot print of the occupied by the nuclear power generation system to a minimum.

Because the steam generators 320 and pressuriser 322 are positioned in the safe zones S, the gantries 301, 302, 303 can be can be mounted at a vertical height between the top of the reactor vessel 200, and the top of the steam generators 320', 320", 320'''. This reduces the total height of the nuclear power generation system by approximately 10 m.

Central support monolith 328 surrounds the reactor vessel 200, to provide structural support. Because of the proximity of the steam generators 320 to the central support monolith 328, it is possible to mount the steam generators 320 directly to the central monolith 328. This improves the structural stability of the nuclear power generation system. As shown, the radially innermost ends of the gantries 301, 302, 303 are also mounted directly to the central monolith 328.

The central support monolith also comprises a first spoke portion 323 which comprises a pair of first spokes, one of which supports the first crane gantry 301. The first spoke portion 323 surrounds the fuel pond 306.

The central support monolith also comprises a third spoke portion 324 which comprises a pair of third spokes that support the third crane gantry rails 309 and surrounds the reactor internals storage position 312.

To perform a maintenance or refuelling operation, the reactor vessel 200 is first depressurised.

Once depressurised, the component hoist is moved along the second gantry rails 308, until it is positioned above the reactor vessel 200. Once in this position, a reactor head tool attachment of the component hoist is lowered until it makes contact with the reactor vessel head 202, at which point it is attached to the reactor vessel head. Once attachment is complete, the component hoist is raised, thereby raising the reactor vessel head 202 away from the reactor vessel 200 to reveal the opening at the top of the reactor vessel. The component hoist is then moved along the rails 308 towards the reactor head storage position 310, where it is stored for the duration of the maintenance/refuelling operation.

Once the reactor head 202 has been removed, the upper reactor vessel internal components can be removed. This is done by moving the further component hoist along the third gantry rails 309, until it is positioned over the reactor vessel 200. Once in this position, a reactor internals tool attachment of the further component hoist is lowered into the reactor vessel 200 until it makes contact with a reactor vessel internal component, at which point it is attached to the reactor vessel internal component. Once attachment is complete, the further component hoist is raised, thereby raising the reactor vessel internal component out of the reactor vessel 200. The further component hoist is then moved along the second component gantry rails 309 until it reaches the reactor internals storage position 312, where the reactor vessel internal component may be stored e.g. for maintenance.

Once the above steps are complete, the reactor vessel 200 can be re-fuelled.

The fuel rod tool hoist is moved along the first gantry 301 to a position above the reactor core 206 of the reactor vessel 200. From here, the hoist is lowered towards the reactor core 206 within the reactor vessel 200, until it makes contact with a (spent) fuel rod 208 at which point it is attached to the fuel rod 208. The fuel rod is then raised back out of the reactor vessel 200, and moved to a position above the fuel pond 306. From here, the spent fuel rod is lowered into the fuel pond.

By reversing the above steps (using a fresh fuel rod from the fuel pond), the reactor vessel can thereby be refuelled, repaired, and re-sealed ready for operation.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A nuclear power generation system comprising:
   a reactor vessel;
   a plurality of steam generators circumferentially spaced about the reactor vessel, the steam generators each having a vertically elongated vessel body portion;
   a first crane gantry defining a fuel rod path along which nuclear fuel rods can be moved to and from the reactor vessel; and a second crane gantry defining a component path along which reactor vessel components can be moved to and from the reactor vessel; wherein the first and second crane gantries both have a fixed radial orientation relative to the reactor vessel, the first crane gantry extends radially in a direction extending between a first and second of the plurality of steam generators, and the first crane gantry is vertically spaced below an upper extremity of the vertically elongated vessel body portion of each of the plurality of steam generators.

2. The system according to claim 1, wherein the second crane gantry extends radially in a direction extending between two of said plurality of steam generators other than between the first and second steam generators.

3. The system according to claim 2, wherein the second crane gantry is vertically spaced below the upper extremity of the plurality of steam generators.

4. The system according to claim 1, wherein the first and second gantries are at an oblique angle of between 110-140° relative to each other.

5. The system according to claim 1, further comprising a third crane gantry defining a further component path along which the reactor vessel components can be moved to and from the reactor vessel wherein the third crane gantry has a fixed radial orientation relative to the reactor vessel.

6. The system according to claim 5, wherein the third crane gantry path extends radially in a direction extending between two of said plurality of steam generators other than between the first and second steam generators and wherein the third crane gantry is non-parallel and non-coaxial with the first and second gantries.

7. The system according to claim 5, wherein the third crane gantry is vertically spaced below the upper extremity of the plurality of steam generators.

8. The system according to claim 5, wherein the first, second and third gantries are equally spaced around the circumference of the reactor vessel.

9. The system according to claim 5, wherein the second and third gantries are joined proximal the reactor vessel to form a combined component gantry so that the component path and the further component path together are a continuous combined component path.

10. The system according to claim 9, wherein the combined component gantry comprises an angular deflection proximal the reactor vessel.

11. The system according to claim 1, wherein the reactor vessel is circumferentially surrounded by a central support monolith.

12. The system according to claim 11, wherein the central support monolith further comprises one or more spoke portions extending radially from the central support monolith, the one or more spoke portions extending under a respective crane gantry portion.

13. A method of operating a nuclear power generation system, the method comprising:
 providing the system according to claim 1;
 moving the nuclear fuel rods along the fuel rod path in the fixed radial orientation relative to the reactor vessel; and/or
 moving the reactor vessel components along the component path in the fixed radial orientation relative to the reactor vessel.

* * * * *